US012625882B2

(12) United States Patent
Kairali et al.

(10) Patent No.: US 12,625,882 B2
(45) Date of Patent: May 12, 2026

(54) INTELLIGENT DATASET SLICING DURING MICROSERVICE HANDSHAKING

(71) Applicant: INTERNATIONAL BUSINESS MACHINES CORPORATION, Armonk, NY (US)

(72) Inventors: Sudheesh S. Kairali, Kozhikode (IN); Ankur Tagra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 17/410,524

(22) Filed: Aug. 24, 2021

(65) Prior Publication Data

US 2023/0061902 A1    Mar. 2, 2023

(51) Int. Cl.
| | |
|---|---|
| *G06F 18/2137* | (2023.01) |
| *G06F 16/27* | (2019.01) |
| *G06F 16/28* | (2019.01) |
| *H04L 67/51* | (2022.01) |

(52) U.S. Cl.
CPC .......... *G06F 16/278* (2019.01); *G06F 16/288* (2019.01); *G06F 18/2137* (2023.01); *H04L 67/51* (2022.05)

(58) Field of Classification Search
CPC ..... G06F 16/278; G06F 16/288; H04L 67/51; G06K 9/6251
See application file for complete search history.

(56) References Cited

U.S. PATENT DOCUMENTS

| | | | |
|---|---|---|---|
| 10,531,288 B2 | 1/2020 | Tran | |
| 10,534,674 B1 | 1/2020 | Karmarkar et al. | |
| 10,795,859 B1 | 10/2020 | Wallace | |
| 10,795,860 B1 | 10/2020 | Wallace | |
| 11,269,752 B1 * | 3/2022 | Bharadwaj | .......... G06F 11/0757 |
| 2018/0034833 A1 | 2/2018 | Ahuja et al. | |
| 2020/0019622 A1 | 1/2020 | Lu et al. | |
| 2020/0127980 A1 | 4/2020 | Smith et al. | |
| 2020/0162380 A1 | 5/2020 | Pilkington et al. | |
| 2021/0090694 A1 * | 3/2021 | Colley | .................... G16B 40/00 |
| 2021/0243247 A1 * | 8/2021 | He | .......................... H04L 41/40 |
| 2022/0217515 A1 * | 7/2022 | Tschofenig | .......... H04L 63/062 |

FOREIGN PATENT DOCUMENTS

| | | |
|---|---|---|
| WO | 2023/025033 A1 | 3/2023 |

OTHER PUBLICATIONS

Garcia-Moreno, Francisco M., et al. "A microservices e-Health system for ecological frailty assessment using wearables." Sensors 20.12 (2020): 3427. (Year: 2020).*

(Continued)

*Primary Examiner* — Mohsen Almani

(74) *Attorney, Agent, or Firm* — CHIP LAW GROUP

(57) ABSTRACT

A computer-implemented process of intelligent dataset slicing within a network having a plurality of microservices is disclosed. Handshaking between a first microservice and a second microservice is initiated. A vertical reduction of a dataset is required by the second microservice and from the first microservice. A first slice of the dataset generated by the vertical reduction is received by the second microservice and from the first microservice. The sliced dataset is evaluated by the second microservice. The vertical reduction is terminated by the second microservice based upon the evaluating.

20 Claims, 7 Drawing Sheets

(56)       References Cited

OTHER PUBLICATIONS

Zheng, Tianlei, et al. "SmartVM: a SLA-aware microservice deploy-
ment framework." World Wide Web 22.1 (2019): 275-293. (Year:
2019).*
Emami Khoonsari, Payam, et al. "Interoperable and scalable data
analysis with microservices: applications in metabolomics." Bioin-
formatics 35.19 (2019): 3752-3760. (Year: 2019).*
WIPO Appln. No. PCT/CN2022/113338, International Search Report
and Written Opinion, Nov. 17, 2022, 10 pg.
Mell, P. et al., The NIST Definition of Cloud Computing, National
Institute of Standards and Technology, U.S. Dept. of Commerce,
Special Publication 800-145, Sep. 2011, 7 pg.

* cited by examiner

100

250

Receive Data ─252

Perform Data Analytics ─254

─256
Good Result?

258 ─ Request More Data    NO

YES

260

| UserID | UserName | Salary | Detail1 | ... | Detail N |
|--------|----------|--------|---------|-----|----------|
|        |          |        |         |     |          |
|        |          |        |         |     |          |
|        |          |        |         |     |          |
|        |          |        |         |     |          |

FIG. 3A

| UserID | UserName | Salary | Detail1 | ... | Detail N |
|--------|----------|--------|---------|-----|----------|

FIG. 3B

| UserID | UserName | Detail2 | ... | Detail N |
|--------|----------|---------|-----|----------|
|        |          |         |     |          |
|        |          |         |     |          |
|        |          |         |     |          |
|        |          |         |     |          |

FIG. 3C

| Detail1 |
|---------|
|         |
|         |
|         |
|         |

FIG. 3D

INTELLIGENT DATASET SLICING DURING MICROSERVICE HANDSHAKING

BACKGROUND

The present invention relates to computer-implemented microservices, and more specifically, to intelligently providing a reduced dataset from one microservice to another microservice.

Software architecture is evolving into a microservice approach. Legacy approaches oftentimes involve a monolithic architecture using a large, tightly-coupled application. By comparison, microservices (also referred to as microservice architecture) are a cloud-native architectural approach in which a single application is composed of many loosely-coupled and independently-deployable smaller components or services (i.e., microservices) that are networked together (e.g., as nodes in a network).

The multitude of microservices that make up an application can be connected to one another in a multitude of different ways. For example, individual microservices can be connected in a chain (i.e., serially) and/or as a tree structure and share data amongst one another. For example, a first microservice can provide first dataset to a second microservice that uses that first dataset to generate a second dataset than is then provided to a third microservice.

Microservices typically have the following characteristics. They have their own technology stack, inclusive of the database and data management model. Additionally, microservices can communicate with one another over a combination of REST APIs, event streaming, and message brokers. Also, microservices can be organized by business capability with the line separating services often referred to as a bounded context.

There are a number of benefits of a microstructure architecture over a monolithic architecture. These benefits include that the code can be updated more easily as new features or functionally can be added without modifying the entire application. Additionally, different stacks and different programming languages can be used for each of the different components. In other words, they can be independently deployable as well as independently modifiable. Still further, the different components can be scaled independently of one another, which reduces the waste and cost associated with having to scale entire applications because, for example, a single feature might be facing too much load. Loose coupling between microservices also builds a degree of fault isolation and better resilience into applications.

One of the problems associated with microservices is that microservice architecture typically requires a large amount of data to be transferred from one microservice to another. A monolithic application typically shares a common stack, which oftentimes includes a large, relational database that supports the entire application, and this allows equal access to the database from the individual components of the application. Thus, the individual components in a monolithic application can request only the data that they need to function. However, since microservices typically have their own stacks they do not have access to a common database. Thus, a particular microservice has to rely upon connected microservices for that data and does not have the option to selectively request data. Consequently, there is a need for an approach that allows individual microservices to optimize data transfers when the microservices are connected in a chain and/or a tree structure.

SUMMARY

A method of intelligent dataset slicing within a network having a plurality of microservices is disclosed. Handshaking between a first microservice and a second microservice is initiated. A vertical reduction of a dataset is required by the second microservice and from the first microservice. A first slice of the dataset generated by the vertical reduction is received by the second microservice and from the first microservice. The sliced dataset is evaluated by the second microservice. The vertical reduction is terminated by the second microservice based upon the evaluating.

A computer hardware system for intelligent dataset slicing within a network having a plurality of microservices is disclosed. The system includes a hardware processor configured to perform the following operations. Handshaking between a first microservice and a second microservice is initiated. A vertical reduction of a dataset is required by the second microservice and from the first microservice. A first slice of the dataset generated by the vertical reduction is received by the second microservice and from the first microservice. The sliced dataset is evaluated by the second microservice. The vertical reduction is terminated by the second microservice based upon the evaluating.

A computer program product for intelligent dataset slicing within a network having a plurality of microservices is disclosed. The computer program product includes a computer readable storage medium having stored therein program code. The program code, which when executed by a computer hardware system, cause the computer hardware system to perform the following. Handshaking between a first microservice and a second microservice is initiated. A vertical reduction of a dataset is required by the second microservice and from the first microservice. A first slice of the dataset generated by the vertical reduction is received by the second microservice and from the first microservice. The sliced dataset is evaluated by the second microservice. The vertical reduction is terminated by the second microservice based upon the evaluating.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 3A-3D are exemplary data structures used in accordance to an embodiment of the present invention.

DETAILED DESCRIPTION

Figure 1:
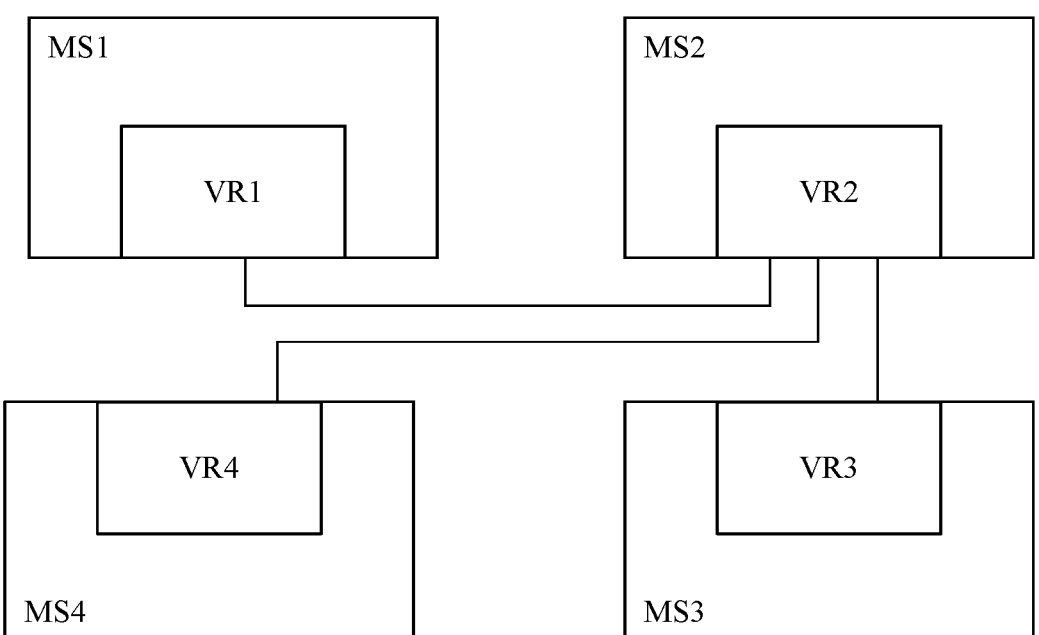
FIG. 1 is a block diagram illustrating an example architecture for use with a computer system for intelligently providing a reduced dataset from one microservice MS1 to another microservice MS2 is depicted according to an embodiment of the present invention.
Figure 2A:
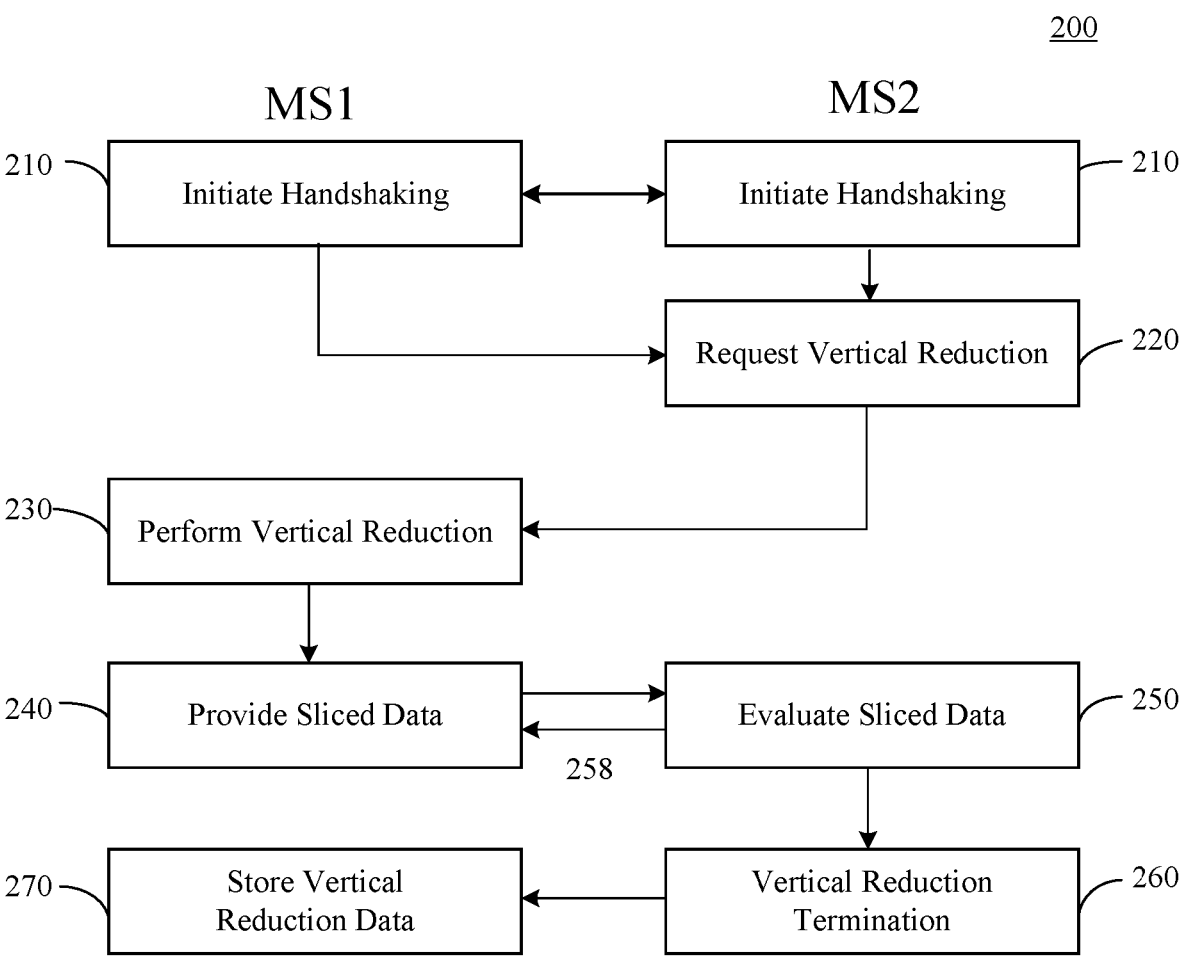
FIGS. 2A-2B are block diagrams illustrating an example method using the architecture of FIG. 1 according to an embodiment of the present invention.
Figure 2B:
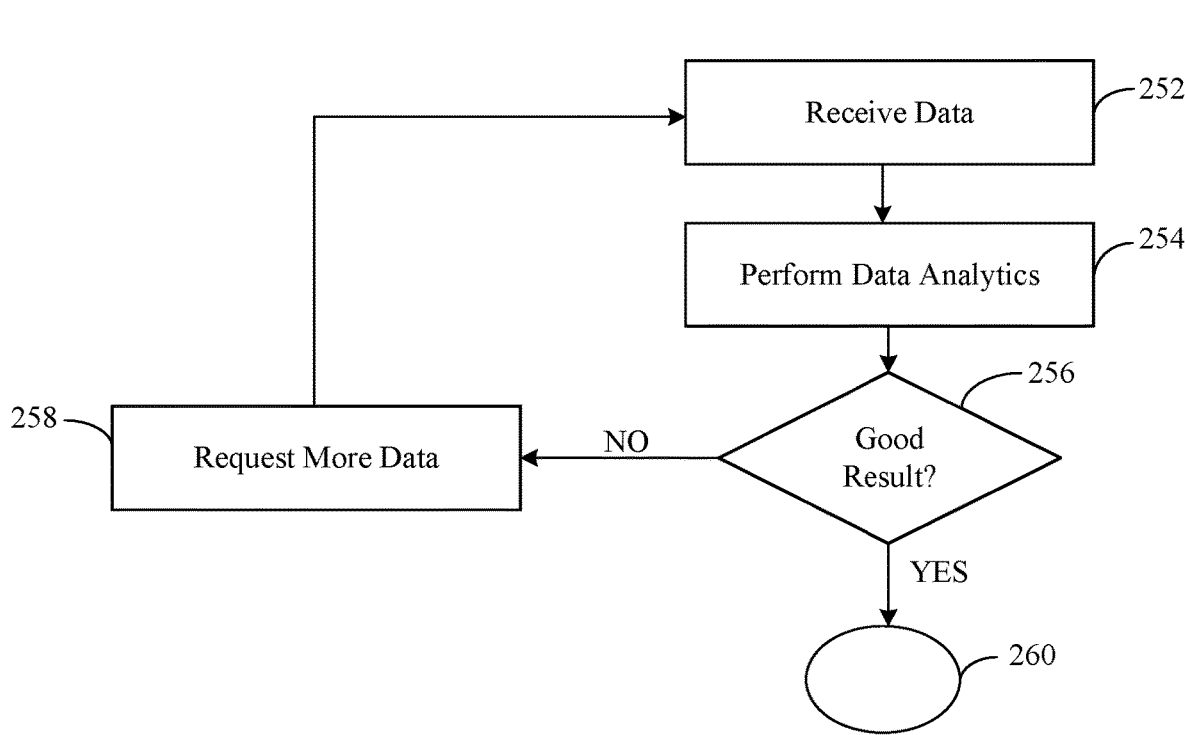

Reference is made to FIG. 2A-2B and FIG. 1, which respectively illustrate a methodology 200 and architecture 100 of intelligently providing a reduced dataset from one microservice MS1 to another microservice MS2. Target microservices can generally be classified as those micros-ervices that perform learning/data processing on datasets, and source microservices can generally be classified as those microservices that provide the datasets to the target micro-services. However, these are not mutually exclusive classi-fication as a single microservice can both perform learning/data processing on a dataset as well as provide processed data to another microservice. An example of this is MS2, which receives a dataset from MS1 and provides processed data to MS3 and MS4. As discussed above, microservices can be arranged along a chain (e.g., MS1 communicates data to MS2, which communicates data to MS3). Additionally or alternatively, microservices can be arranged in a tree struc-ture (e.g., MS2 communicates data to both MS3 and MS4). In the context of the present disclosure, a source microser-vice is described with regard to MS1 and a target micros-ervice is described with regard to MS2.

Although not limited in this manner, each microservice MS1-MS4 within the computer system as a whole can includes its own respective vertical reducer VR1-VR4. Each vertical reducer VR1-VR4 is configured to communicate with each other using a vertical reduction handshaking protocol. An advantage of employing vertical reducers VR1-VR4, as will be described in more detail below, is that ability to reduce the size of the datasets sent between microservices. Large datasets are both costly in terms of network perfor-mance (e.g., between microservices) and in terms of process performance (e.g., by individual microservices). Conse-quently, to the extent that a requested dataset can be reduced, the computer system as a whole that includes the microser-vices can be improved. Other aspects of the vertical reducers VR1-VR4 will be described in more detail below.

Referring to FIG. 2 and operation 210, a vertical reduction handshaking is initiated between MS1 and MS2. The hand-shaking can be initiated by either MS1 or MS2 and/or the handshaking can be initiated in response to a request 220, by MS2, for a vertical reduction of a dataset. As used herein, the phrase vertical reduction of a dataset refers to a portion (or slice) of the dataset.

As discussed above, the handshaking can be performed by vertical reducers VR1, VR2 using the vertical reduction handshaking protocol. FIG. 3A illustrates an exemplary dataset that is capable of being transferred from MS1 to MS2. Although not limited in this manner, the handshaking process can include sending of metadata (e.g., the names of columns of data, as illustrated in FIG. 3B) that characterizes the dataset.

In 230, the actual vertical reduction of the dataset can be performed by VR1. The present disclosure is not limited as to a particular approach to performing vertical reduction of the dataset. Examples dimensionality reduction algorithms for performing vertical reduction include missing values ratio; low variance filter; high correlation filter; random forests/ensemble trees; principal component analysis (PCA); backward feature elimination; forward feature construction among others. The result of the vertical reduction is the creation of a reduced dataset. Although not limited in this manner, the vertical reduction of the dataset can be per-formed in phases, with each phase being smaller than the next. The initial phase (also described as an initial set or reduced dataset) is, in certain instances, a smallest version of the dataset that the MS2 is anticipated to be capable of using.

The approach by which the original dataset can be reduced is not limited and can vary depending one or more factors. For example, the original dataset can be first filtered based upon selected vertical reduction algorithms, which the selections based upon an initial design of the MS1 and/or input from the MS2. In one example, the MS2 can provide input after receiving a reduced dataset. The reduction of the original dataset can also use one or more dimensionality reduction algorithms. As one example, the original dataset can be reduced by providing a predetermined (or selected) number of columns (e.g., the first 10 columns) of the original dataset.

The other phases can include additional slices that increase the size of the reduced dataset, and these additional slices can be provided in an automatically identified order. This order can be determined, for example, by VR1 based upon the vertical approach employed. Also, additional infor-mation provided by MS2 can also be used to inform VR1 as to how the reduced dataset and one or more additional slices can be identified. Again, for example, after the first 10 columns of the original dataset has been provided, the next 10 columns can be provided.

In 240, the sliced dataset can be provided by VR1 to MR2 via VR2. Again, the first slice being provided is referred to as the reduced dataset. With reference to FIG. 3C, a deter-mination may be made, for example, that the reduced dataset, only requires 10 pieces of data (i.e., columns) per UserID—i.e., UserName and Detail2 through Detail 10.

In 250, the reduced dataset is evaluated by MS2, as further illustrated in FIG. 2B. In 252, the reduced dataset is received by VR2 of MS2. Next in 254, data analytics are performed on the reduced dataset. The data analytics determine whether the reduced dataset is capable of providing a desirable result, which is evaluated in 256. What constitutes a desirable result depends upon the particular microservice using the data. For example, MS2 may include a model that is being trained by the reduced dataset. In this instance, whether the model is successfully trained by the reduced dataset determines whether the reduced dataset is capable of providing a desirable result.

In certain instances, MS2 performs the data analytics on the reduced dataset. However, in addition to or alternatively, other microservices (e.g., MS3 and/or MS4 illustrated in FIG. 1) may also be involved in evaluating the reduced dataset to determine if the reduced dataset is capable of providing a desired result. For example, the reduced dataset may be used to produce processed data that is subsequently consumed by one or more other microservices MS3, MS4, and a determination of whether a reduced dataset is capable of providing a desirable result is based upon the processed data being sufficient for the other microservices MS3, MS4 to provide desirable result(s) of their own. As such, an evaluation of whether the reduced dataset provides a desir-able result may be dependent upon whether the processed data, produced from the reduced dataset, is capable of providing a desirable result as determined by dependent microservices MS3, MS4. As would be readily recognized, these dependent microservices MS3, MS4 may themselves produce processed data that is subsequent used by one or more other microservices (not illustrated).

If a good result is not achieved, VR2 communicates with VR1 of MS1, e.g., with the vertical reduction handshaking protocol, to request an additional slice of the original data-set. This additional slice, for example, could include one or more columns of the original dataset that were not included in the reduced dataset. In addition to or alternative, the request for an additional slice of the original dataset can specify specific portions of the dataset to be provided. After the additional slice is determined, the additional slice (e.g., Detail1, as illustrated in FIG. 3D) is forwarded by VR1 and received by VR2 in 252. Notably, only the additional slice need be communicated from MS1 to MS2. Afterwards, VS2 can merge the additional slice with the reduced dataset to generate a modified reduced dataset. This modified reduced dataset can be then be analyzed in 254 to determine whether the modified reduced dataset is capable of providing a desirable result. These operations can be iteratively performed until a determination that a desirable result has been achieved.

In 260, after a determination is made that a desirable result has been achieved with the reduced dataset or the modified reduced dataset, a vertical reduction termination operation can be performed. This termination operation involves VR2 communicating with VR1, e.g., via the vertical reduction handshaking protocol. This communication indicates that an additional slice is not required and the vertical reduction operations can terminate.

In 270, data about the vertical reduction (i.e., vertical reduction data or "VR" data) can be stored for future use. For example, after being informed that MS2 has terminated the vertical reduction, MS1 can store VR data about the vertical reduction that was performed. This VR data may include, for example, identification of the additional slices that were provided from MS1 to MS2. In so doing, MS1 can respond to a subsequent vertical reduction request by MS2 by not only providing the reduced dataset but also the additional data that was subsequently provided (e.g., Detail1 in the above-described example). In so doing, the VR data saved in 270 can be subsequently used in future vertical reduction operations of 230.

While this operation is performed by MS1, the methodology is not limited in this manner. For example, the storing of the VR data could be performed by MS2, and the stored VR data could be accessible by the MS1. The aforementioned approach is particularly advantageous when the architecture of the original dataset infrequently changes. In that instance, previously-identified vertical reductions of the original dataset can be applied in future situations in which the original dataset is requested. In instances in which new dimensions are added to (or removed from) the original dataset, the vertical reducers can be employed to retrain themselves to identified a preferred/optimal number of data dimensions needed by the target microservice.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 4:
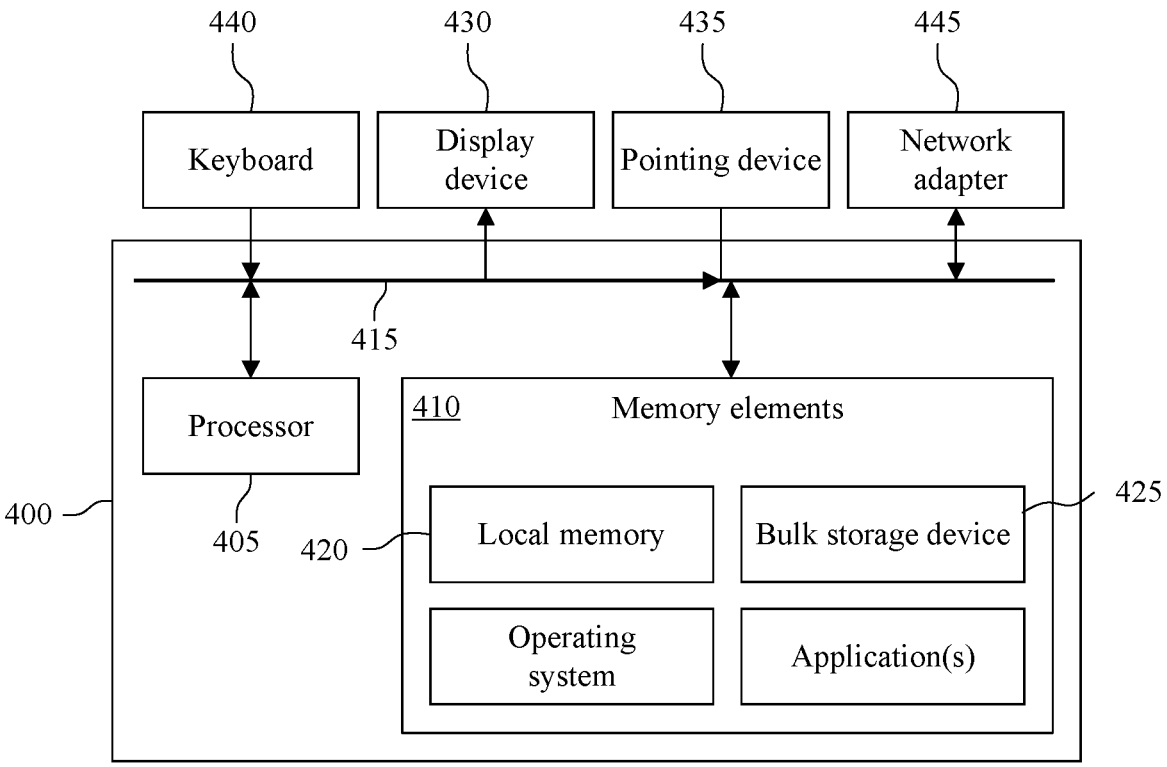
FIG. 4 is a block diagram illustrating an example of computer hardware system for implementing the scanning service of FIG. 1.

FIG. 4 is a block diagram illustrating example architecture for a data processing service 400 for executing the computer system 100 for intelligently providing a reduced dataset from one microservice MS1 to another microservice MS2. The data processing system 400 can include at least one processor 405 (e.g., a central processing unit) coupled to memory elements 410 through a system bus 415 or other suitable circuitry. As such, the data processing system 400 can store program code within the memory elements 410. The processor 405 can execute the program code accessed from the memory elements 410 via the system bus 415. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 400 also can include one or more cache memories (not shown) that provide temporary storage of at least some program code in order to reduce the number of times program code must be retrieved from the local memory 420 and/or bulk storage device 425 during execution.

Input/output (I/O) devices such as a display 430, a pointing device 435 and, optionally, a keyboard 440 can be coupled to the data processing system 400. The I/O devices can be coupled to the data processing system 400 either directly or through intervening I/O controllers. For example, the display 430 can be coupled to the data processing system 400 via a graphics processing unit (GPU), which may be a component of the processor 405 or a discrete device. One or more network adapters 445 also can be coupled to data processing system 400 to enable the data processing system 400 to become coupled to other systems, computer systems, remote printers, and/or remote storage devices through intervening private or public networks. Modems, cable modems, transceivers, and Ethernet cards are examples of different types of network adapters 445 that can be used with the data processing system 400.

As pictured in FIG. 4, the memory elements 410 can store the components of the vertical reducers VR1-VR4 of FIG. 1.

Being implemented in the form of executable program code, these components of the data processing system 400 can be executed by the data processing system 300 and, as such, can be considered part of the data processing system 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.
Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
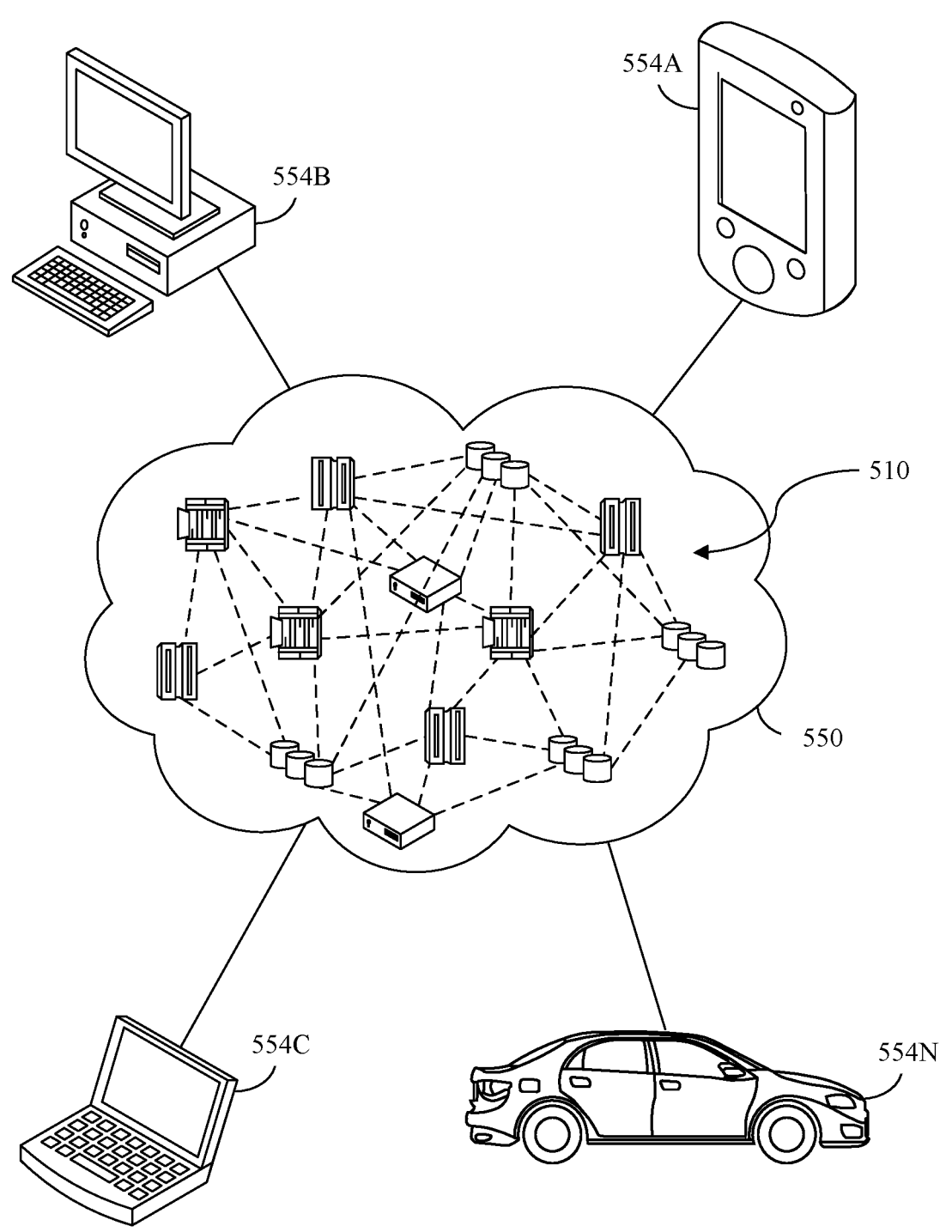
FIG. 5 depicts a cloud computing environment according to an embodiment of the present invention.

Referring now to FIG. 5, illustrative cloud computing environment 550 to be used with the computer system 100 for intelligently providing a reduced dataset from one microservice MS1 to another microservice MS2 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
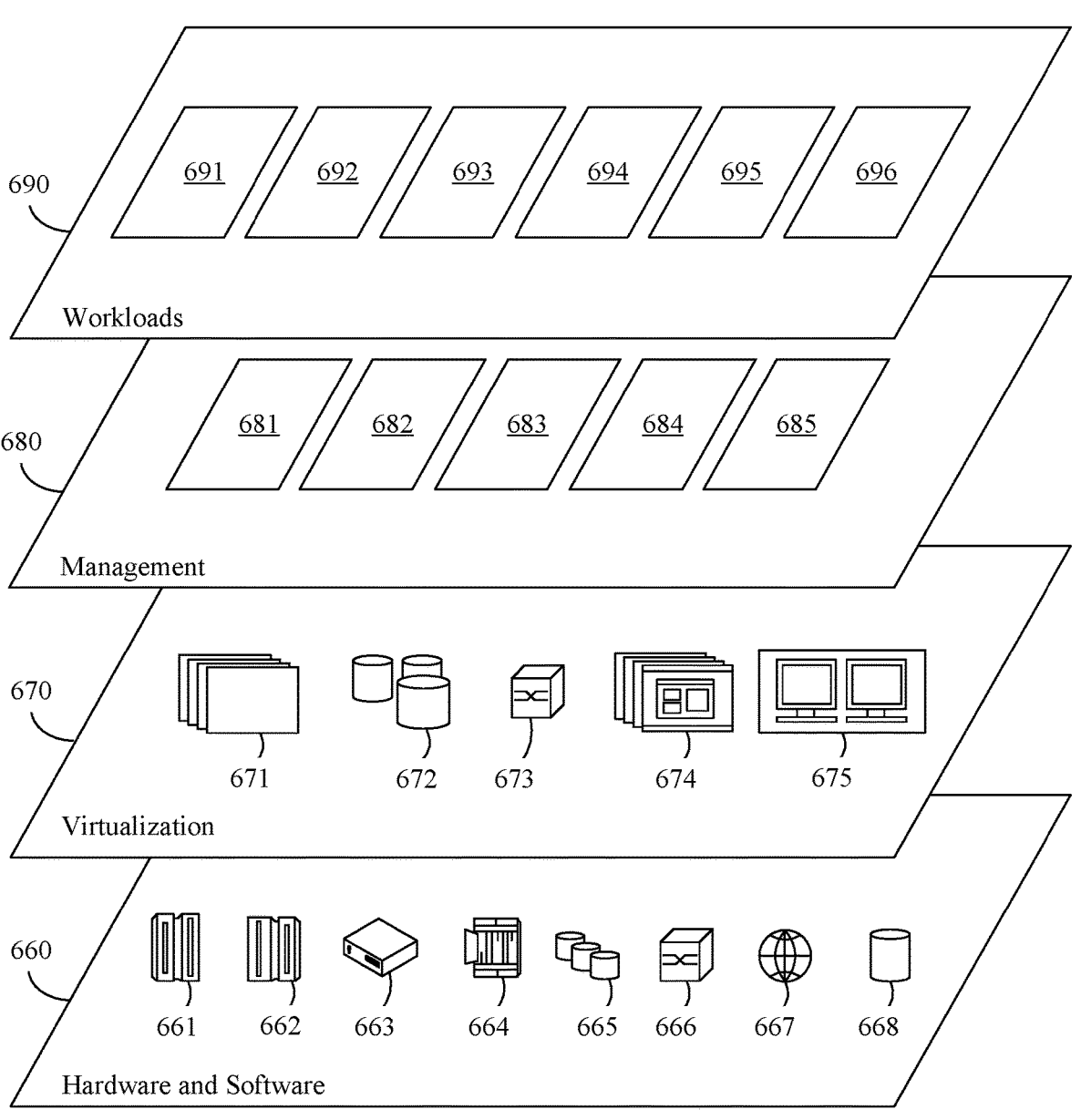
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and operations of the computer system 100 for intelligently providing a reduced dataset from one microservice MS1 to another microservice MS2.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process of intelligent dataset slicing within a network having a plurality of microservices, comprising:

initiating handshaking between a first microservice and a second microservice, requesting, by the second microservice and from the first microservice, a vertical reduction operation on a dataset;

receiving, by the second microservice and from the first microservice, a first slice of the dataset generated by the vertical reduction operation as a reduced dataset;

evaluating, by the second microservice, the reduced dataset to determine whether the reduced dataset provides a desired result; and communicating, by the second microservice to the first microservice and based upon the evaluating, a communication to terminate the vertical reduction operation.

2. The method of claim 1, wherein
an additional slice of the dataset is requested from the first microservice based upon the evaluating.

3. The method of claim 2, wherein
the evaluating includes:
  performing data analytics on the first slice of the dataset,
  determining, based upon the data analytics, that the reduced dataset does not provide the desired result, and
  requesting the additional slice based upon the determining.

4. The method of claim 3, wherein
the determining is based upon a third microservice that evaluates results from the data analytics.

5. The method of claim 1, wherein
the vertical reduction operation is performed by the first microservice using a dimensionality reduction algorithm.

6. The method of claim 1, wherein
the terminating is based upon the evaluating determining that a desirable result is produced.

7. The method of claim 6, wherein
vertical reduction data regarding the vertical reduction operation on the dataset is saved responsive to the terminating.

8. The method of claim 1, wherein
the initiating, the requesting, the receiving, the evaluating, and the terminating are performed by a vertical reducer, and
each of the first and second microservices includes the vertical reducer.

9. A computer hardware system configured for intelligent dataset slicing within a network having a plurality of microservices, comprising:
  a hardware processor configured to perform the following executable operations:
    initiating handshaking between a first microservice and a second microservice,
    requesting, by the second microservice and from the first microservice, a vertical reduction operation on a dataset;
    receiving, by the second microservice and from the first microservice, a first slice of the dataset generated by the vertical reduction operation as a reduced dataset;
    evaluating, by the second microservice, the reduced dataset to determine whether the reduced dataset provides a desired result; and
    communicating, by the second microservice to the first microservice and based upon the evaluating, a communication to terminate the vertical reduction operation.

10. The system of claim 9, wherein
an additional slice of the dataset is requested from the first microservice based upon the evaluating.

11. The system of claim 10, wherein
the evaluating includes:
  performing data analytics on the first slice of the dataset,
  determining, based upon the data analytics, that the reduced dataset does not provide the desired result, and
  requesting the additional slice based upon the determining.

12. The system of claim 11, wherein
the determining is based upon a third microservice that evaluates results from the data analytics.

13. The system of claim 9, wherein
the vertical reduction operation is performed by the first microservice using a dimensionality reduction algorithm.

14. The system of claim 9, wherein
the terminating is based upon the evaluating determining that a desirable result is produced.

15. The system of claim 14, wherein
vertical reduction data regarding the vertical reduction operation on the dataset is saved responsive to the terminating.

16. The system of claim 9, wherein
the initiating, the requesting, the receiving, the evaluating, and the terminating are performed by a vertical reducer, and
each of the first and second microservices includes the vertical reducer.

17. A computer program product for intelligent dataset slicing within a network having a plurality of microservices, comprising:
  a computer readable storage medium having stored therein program code,
  the program code, which when executed by a computer hardware system, cause the computer hardware system to perform:
    initiating handshaking between a first microservice and a second microservice,
    requesting, by the second microservice and from the first microservice, a vertical reduction operation on a dataset;
    receiving, by the second microservice and from the first microservice, a first slice of the dataset generated by the vertical reduction operation as a reduced dataset;
    evaluating, by the second microservice, the reduced dataset to determine whether the reduced dataset provides a desired result; and
    communicating, by the second microservice to the first microservice and based upon the evaluating, a communication to terminate the vertical reduction operation.

18. The computer program product of claim 17, wherein
an additional slice of the dataset is requested from the first microservice based upon the evaluating, and
the evaluating includes:
  performing data analytics on the first slice of the dataset,
  determining, based upon that the data analytics, that the reduced dataset does not provide the desired result, and
  requesting the additional slice based upon the determining.

19. The computer program product of claim 17, wherein
the determining is based upon a third microservice that evaluates results from the data analytics.

20. The computer program product of claim 17, wherein
the vertical reduction operation is performed by the first microservice using a dimensionality reduction algorithm,
the terminating is based upon the evaluating determining that the desirable result is produced,
vertical reduction data regarding the vertical reduction operation on the dataset is saved responsive to the terminating,
the initiating, the requesting, the receiving, the evaluating, and the terminating are performed by a vertical reducer, and each of the first and second microservices includes the vertical reducer.

\* \* \* \* \*